United States Patent [19]

Drutchas

[11] 4,415,054
[45] Nov. 15, 1983

[54] STEERING GEAR

[75] Inventor: Gilbert H. Drutchas, Birmingham, Mich.

[73] Assignee: TRW Inc., Cleveland, Ohio

[21] Appl. No.: 405,705

[22] Filed: Aug. 5, 1982

[51] Int. Cl.³ .............................................. B62D 5/04
[52] U.S. Cl. .............................. 180/79.1; 74/424.8 R; 192/0.02 R; 192/0.07; 180/142
[58] Field of Search ............... 180/79, 79.1, 142, 143; 192/0.02 R, 0.07, 1; 74/424.8 R

[56] References Cited

U.S. PATENT DOCUMENTS

| | | | |
|---|---|---|---|
| 1,231,885 | 3/1917 | Heinze | 180/79.1 |
| 1,711,662 | 5/1929 | Suekert | 180/79.1 |
| 2,670,449 | 2/1954 | Brice | 192/0.02 R |
| 3,161,074 | 12/1974 | Korthaus et al. | 192/0.02 R |
| 3,512,426 | 5/1970 | Dabringhaus | 74/459 |
| 3,939,938 | 2/1976 | Inoue | 180/142 |
| 3,983,953 | 10/1976 | Bayle | 180/79.1 |
| 4,019,616 | 4/1977 | Thorne | 197/90 |

FOREIGN PATENT DOCUMENTS

| | | |
|---|---|---|
| 964565 | 5/1957 | Fed. Rep. of Germany . |
| 55-44058 | 3/1980 | Japan ................................. 180/79.1 |
| 645000 | 10/1950 | United Kingdom . |
| 1410956 | 10/1975 | United Kingdom . |

OTHER PUBLICATIONS

Handbook for Applying Solid State Hall Effect Sensors, Chapter III.

*Primary Examiner*—Joseph F. Peters, Jr.
*Assistant Examiner*—Kenneth R. Rice
*Attorney, Agent, or Firm*—Yount & Tarolli

[57] ABSTRACT

A steering gear for turning steerable wheels of a vehicle comprises a member movable in opposite directions. The member has first and second portions. The first portion comprises a rack having gear teeth extending transverse to the direction of movement of the member. A manually rotatable pinion engages the rack for applying a first force to the rack. An electric motor applies a second force to the second portion of the member. The electric motor encircles the member and rotates a ball nut. The ball nut cooperates with a screw portion of the member to effect linear movement of the member in response to actuation of the motor.

6 Claims, 8 Drawing Figures

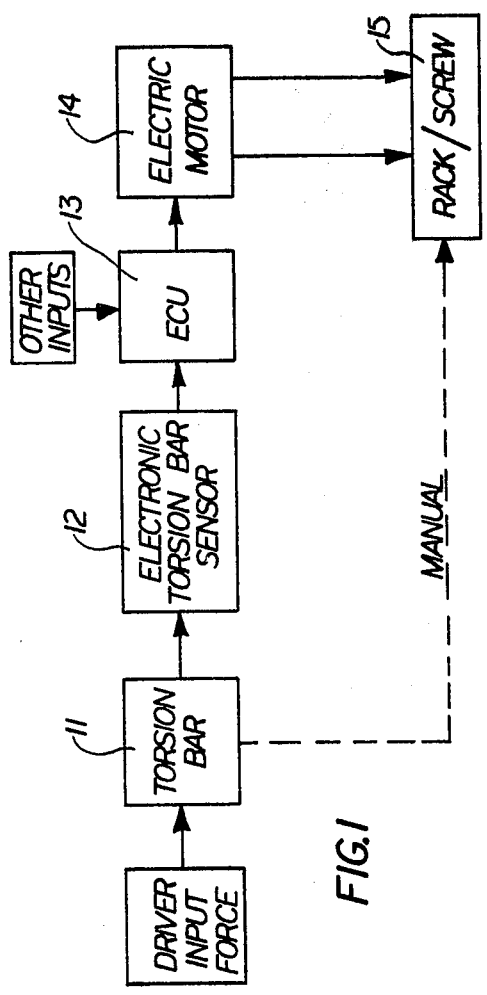
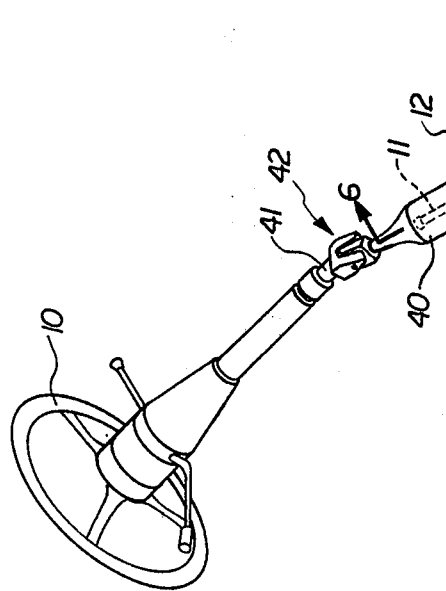
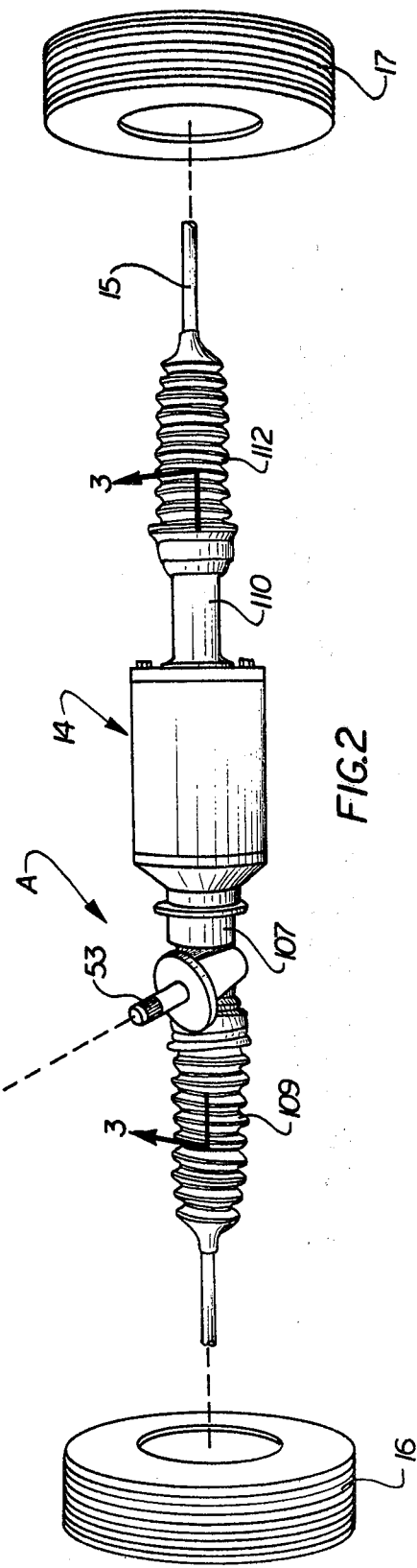
FIG.1
FIG.2

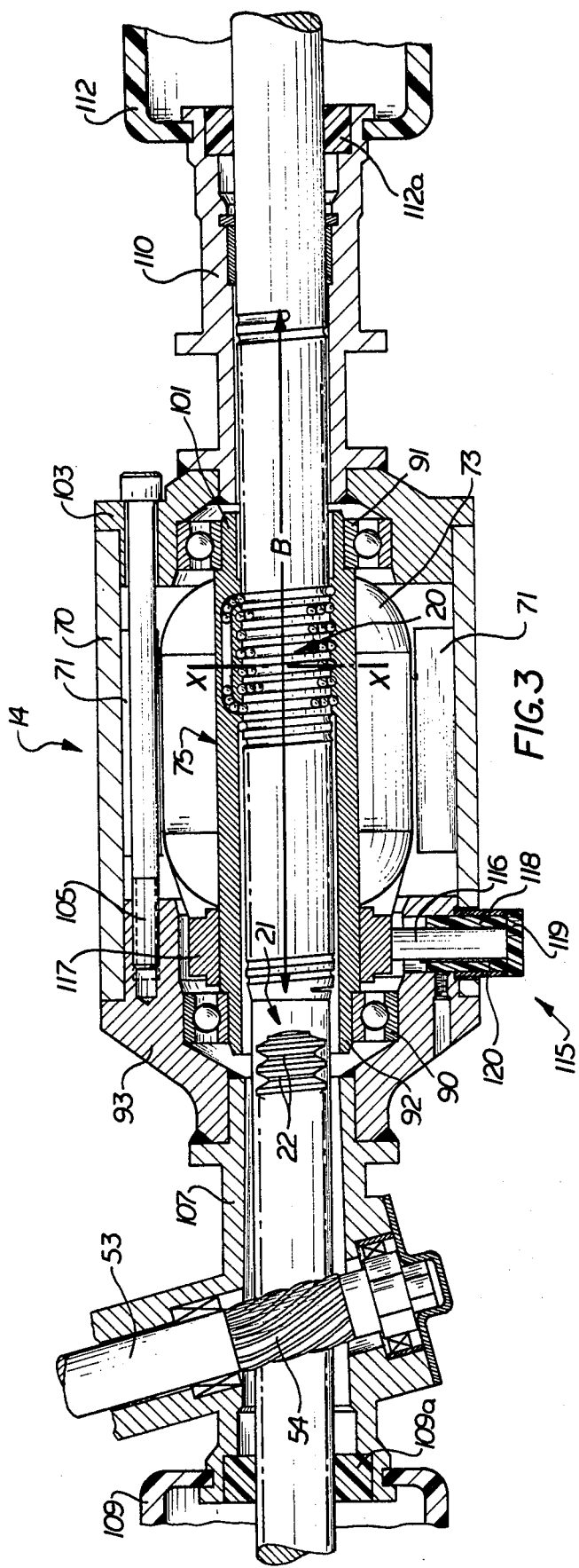
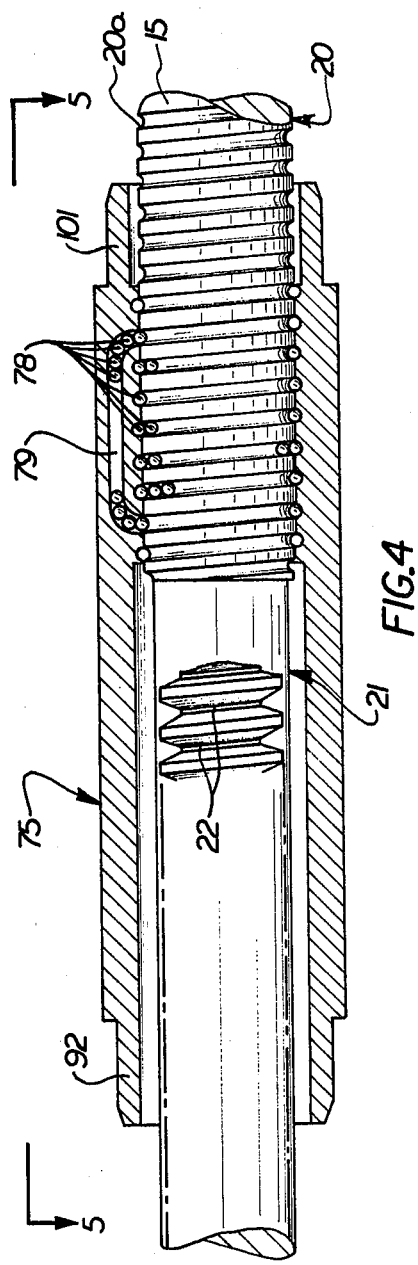

STEERING GEAR

BACKGROUND AND SUMMARY OF THE INVENTION

The present invention relates to a steering gear for turning steerable wheels of a vehicle and, in particular, to a power assist rack and pinion steering gear.

There are many known power rack and pinion steering gear designs. Some use hydraulic power and others electrical power. Power rack and pinion steering gear designs which utilize electrical power normally include an electric motor. An example is shown in U.S. Pat. No. 3,983,953. In U.S. Pat. No. 3,983,953 the electric motor is energized in response to turning of the steering wheel. When the steering wheel turns a switch is actuated to actuate the motor. The motor applies a driving force to the pinion. Thus, the motor provides an assist to the pinion.

The present invention is directed to an electric power rack and pinion steering gear. Specifically, the present invention includes a power transmitting member which is movable linearly in opposite directions to effect turning of the wheels of the vehicle in opposite directions. A first portion of the member comprises a rack. A manually rotated pinion engages the rack and applies a force to the rack. An electric motor is provided to apply an assisting force to a second portion of the member. The force is applied directly to the power transmitting member, but not through the pinion.

The electric motor has a rotatable armature encircling the force transmitting member. The armature has a drive connection to the member so as to effect linear movement of the member in a desired direction in response to rotation of the armature.

In the preferred embodiment, the drive connection is located between an armature and a linearly movable member and includes a ball nut. A screw thread is formed on the second portion of the member. Rotation of the armature is converted into linear movement of the member through the ball nut and screw thread.

The preferred embodiment includes a torsion bar located in the steering column between the steering wheel and the pinion. The torsion bar deflects in response to the torque created by rotation of the steering wheel. A torsion bar deflection sensor is provided to create an electric signal. If there is a sufficient torque, i.e., resistance to turning of the pinion, the torsion bar will twist, upon rotation of the steering wheel and the electric signal will be created to effect energization of the motor to provide an assist to the force transmitting member.

If the electric motor fails, the pinion is rotated manually to effect movement of the rack. Manual steering of the vehicle will thus be possible. Thus, a manual failsafe mode of operation of the steering gear is provided.

In one specific embodiment of the present invention, the armature of the electric motor is mounted coaxially with the screw portion of the force transmitting member which moves linearly. The armature is axially fixed relative to the member. With current flows through the armature, the armature rotates. The armature is drivingly connected to the ball nut. Rotation of the armature causes rotation of the ball nut. A plurality of balls which are associated with the ball nut and the screw portion of the member effect linear movement of the force transmitting member in response to rotation of the ball nut.

In another embodiment of the present invention, a clutch is interposed between the armature and the movable force transmitting member. Specifically, in this embodiment, the armature of the motor is axially offset in a magnetic field created by permanent magnets of the motor. When an electrical current is applied to the armature, the armature tends to center itself in the magnetic field of the permanent magnets by moving axially in the magnetic field. When the armature moves axially, the clutch is engaged to create a drive connection between the armature and the ball nut. Thus, when the ball nut is rotated by rotation of the armature, the member moves axially through engagement of the balls in the screw portion to cause turning movement of the wheels of the vehicle, as in the embodiment discussed above.

DESCRIPTION OF THE DRAWINGS

Further features and advantages of the present invention will be apparent to those skilled in the art to which the invention relates from the following detailed description of preferred embodiments of the invention made with reference to the accompanying drawings in which:

FIG. 1 is a schematic flow diagram illustrating a vehicle steering system embodying the present invention;

FIG. 2 is a perspective schematic view illustrating a portion of the system of FIG. 1;

FIG. 3 is a sectional view taken approximately along the line 3—3 of FIG. 2;

FIG. 4 is an enlarged fragmentary view of a portion of the steering mechanism shown in FIG. 3;

DESCRIPTION OF PREFERRED EMBODIMENTS

Figure 5:
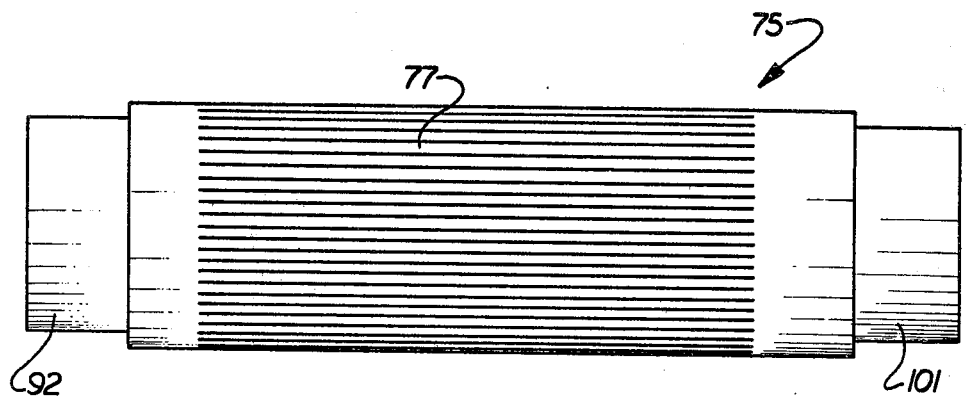
FIG. 5 is a view of the structure shown in FIG. 4, taken along the line 5—5 thereof.

As noted above, the present invention relates to a steering gear for turning steerable wheels of a vehicle. In particular the present invention relates to a steering gear A (FIG. 2) which includes a force transmitting member 15 which moves linearly in opposite directions to cause pivoting of the dirigible wheels 16, 17 of the vehicle about a vertical axis. The steering gear A of the present invention is embodied in a system illustrated in FIG. 1. The system of FIG. 1 responds to rotation of a hand or steering wheel 10.

When the driver rotates the steering wheel 10, a driver input torque is applied to a torsion bar 11 located in a steering column in series with the steering wheel 10. Associated with the torsion bar 11 is an electronic torsion bar deflection sensor 12. The electronic torsion bar deflection sensor 12 applies a signal to an electronic control unit 13 (FIG. 1) which signal indicates the direction and amount of twist, i.e., deflection of the torsion bar 11. The direction and amount of deflection of the torsion bar 11 are related to the direction of steering wheel rotation and the torque applied to the steering column. Other inputs may also be communicated to the electronic control unit 13. These other inputs, for example, may be the speed of the vehicle.

After receiving all of the desired inputs, the electronic control unit 13 provides an output control current to an electric motor 14 to operate same in a direction of rotation and at a speed and torque which is related to the applied current. The electric motor 14 will then apply a steering assist force to the translatable member 15. In the event there is an electrical failure, a manual drive is provided between the driver's input and the member 15 so that manual steering occurs.

When the member 15 (FIG. 2) moves, it effects a pivoting movement of the dirigible wheels 16, 17 of the vehicle. The member 15 moves linearly in opposite directions. The member 15 is moved linearly in opposite directions, either by a manual force applied thereto due to rotation of the handwheel 10 or by a combination of the manual force and the force applied thereto by the electric motor 14.

The member 15 has a screw portion 20 (FIG. 3) having a screw thread or worm 20a thereon. The member 15 also has a portion 21 which has rack teeth 22 thereon. The rack teeth 22 extend transverse to the direction of movement of the member 15. The portion 21 is aligned with the portion 20 and attached thereto for simultaneous movement.

When the hand wheel 10 is rotated a steering column member 41 (see FIG. 2) is rotated. The steering column member 41 is connected to an upper coupling member 40 which is also rotated. The upper coupling member 40 is mechanically connected to the steering column member 41 through a Cardon joint 42. The coupling member 40 in part encircles a lower coupling member 50 (see FIG. 6) which is attached by a Cardon joint 52 (FIG. 2) to a steering gear input shaft 53. The steering gear input shaft 53 has a pinion gear 54 drivingly connected thereto (see FIG. 3). The pinion gear 54 is a helical pinion which meshes with the rack teeth 22.

Figure 6:
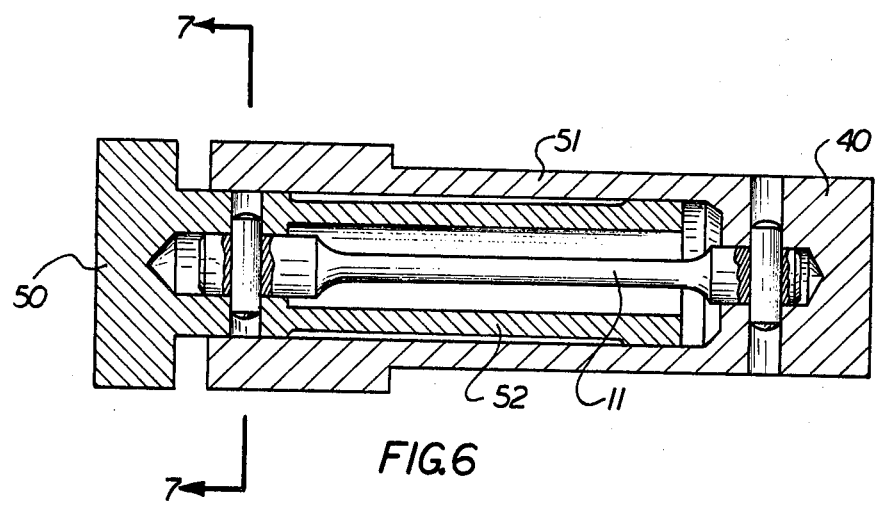
FIG. 6 is a sectional view taken approximately along the line 6—6 of FIG. 1.

The torsion bar 11 is interposed between the coupling parts 40, 50 (see FIG. 6). As shown in FIG. 6, the coupling part 40 has a tubular portion 51 which receives a tubular portion 52 of the coupling part 50. The outer surface of the coupling part 50 and the inner surface of the coupling part 40 engage. One end of the torsion bar 11 is pinned to the upper coupling part 40 and the other end is pinned to the lower coupling part 50. The torsion bar 11 is located coaxial with the coupling parts 40, 50.

When the steering wheel 10 (FIG. 2) is rotated and the resistance to rotation of the pinion 54 (FIG. 3) is low, such as occurs if the vehicle wheels are on ice, no torque is developed in the steering column parts and the torsion bar 11 (FIG. 6) will drive the pinion with no substantial deflection. Accordingly, torque is transmitted from the steering wheel 10 through the torsion bar 11 to the steering input shaft 53 (FIG. 2) effecting rotation of the pinion 54 and movement of the member 15 to pivot the wheels 16, 17 of the vehicle.

If, however, there is a resistance to turning of the wheels 16, 17, relative rotation occurs between coupling parts 40 and 50 and the torsion bar 11 is deflected, i.e., twists. The amount of deflection and the direction of rotation of the torsion bar 11 is sensed by the torsion bar deflection sensor 12 (FIG. 7).

Figure 7:
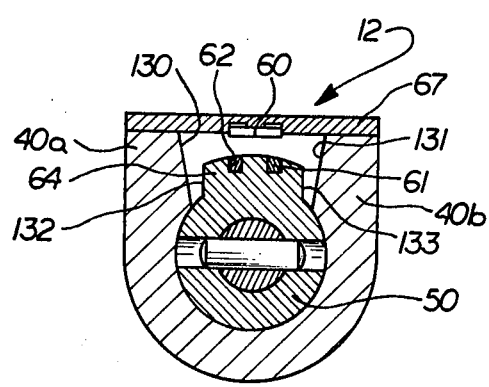
FIG. 7 is a view of the structure shown in FIG. 6 taken approximately along the line 7—7 of FIG. 6.

The torsion bar deflection sensor 12, shown in FIG. 7, includes a Hall effect device 60 and a pair of magnets 61, 62. The pair of magnets 61, 62 are carried on a portion 64 of the coupling part 50. The portion 64 projects between opposite leg portions 40a, 40b of the coupling part 40. The Hall effect device 60 is carried on a plate 67 attached to the coupling part 40.

The magnet 61 has its north pole facing the Hall effect device 60. The magnet 62 has its south pole facing the Hall effect device 60. When these magnets are moved relative to the Hall effect device 60, a signal is created which is delivered to the electronic control unit 13. The signal indicates the amount of twisting of the torsion bar 11, i.e., the amount of angular movement of one end of the torsion bar relative to the other end, and the direction of rotation of the torsion bar. The electronic torsion bar sensor 12 disclosed herein is not my invention, and is disclosed to comply with the "best mode" requirement of 35 USC ¢112.

The electric motor 14 (FIG. 3) is a reversible permanent magnet electric motor. The motor 14 is mounted coaxially of the screw portion 20 of the member 15. Specifically, the motor 14 includes a housing member 70 which is fixedly connected with the frame of the vehicle and carries a plurality of permanent magnets 71. The permanent magnets 71 surround a rotatable motor armature 73. The armature 73 is of a conventional construction. The armature 73 is made up of a plurality of plastic laminations having windings wound therearound.

The armature 73 encircles a ball nut 75. The ball nut 75 is a tubular member which extends coaxially of the screw portion 20 of the member 15. The outer diameter of the ball nut 75 is knurled at 77, shown in FIG. 5. The knurling 77 provides a friction drive between the inner diameter of the armature 73 and the ball nut 75. Thus, upon rotation of the armature 73, the ball nut 75 is rotated. When the ball nut 75 rotates, the member 15 is driven axially because of the cooperation of the plurality of balls 78 (FIG. 4) associated with the ball nut 75 and the screw portion 20 of the member 15.

The balls 78 are located in a recirculating channel 79 in the ball nut 75, in a portion of the screw thread 20a on the member 15 and in a corresponding screw thread on the inner diameter of the ball nut 75. The rotation of the ball nut 75 effects linear movement of the member 15. As the ball nut 75 rotates a recirculation of the balls through channel 79 occurs, as is well known. More specifics of the ball nut 75 and its operation can be obtained by reference to U.S. Pat. No. 3,512,426. This patent discloses a ball nut and screw assembly similar to that employed in the present invention and discloses specifically how the balls are placed in the assembly. These details, since known, will not be described herein.

The ball nut 75 is supported at its opposite ends in bearings 90, 91 (FIG. 3). The bearings 90, 91 support the ball nut 75 for rotation relative to the housing 70 of the electric motor 14. Specifically, the bearing 90 is located between an end portion 92 of the ball nut 75 and an end cap 93 at the left end of the motor 14, as viewed in FIG. 3. The bearing 91 is located between a projecting portion 101 of the ball nut 75 and an end cap 103 on the right end of the motor 14, as viewed in FIG. 3. The bearings 90 and 91 support the ball nut for rotation and also restrain the ball nut 75 from axial movement relative thereto as is clear from the drawings.

The various parts of the motor 14 are secured together by suitable fasteners 105 which extend through the end cap 103, and into the end cap 93. The screw fasteners hold the entire motor 14 axially together.

A suitable housing member, generally designated 107, is welded to the end cap 93 and defines a chamber for the pinion 54. The housing 107 at its leftwardmost end, as viewed in FIG. 3, is suitably attached to a boot 109. The boot 109 extends along the member 15 and is attached thereto at its outer end. The boot 109 cooperates with a seal 109a to maintain lubricant for the gears, bearings, etc. in the housing 102 and prevent dust, dirt and any other foreign matter from entering the housing and affecting performance of the pinion 54, etc.

The end cap 103 also has a protecting portion 110 welded thereto. The portion 110 projects along member 15 to the right, as shown in FIG. 3, and terminates at its outer end in a portion having a boot 112 attached thereto. The boot 112 cooperates with a seal 112a to block dirt, dust and other foreign matter from contact with the electric motor 14.

From the above it should be apparent that when the armature 73 is rotated, the member 15 will move in a direction, depending upon the direction of rotation of the armature 73. The armature 73 will be rotated in a direction depending upon the magnitude and direction of current flow through the windings of the armature 73. The direction and magnitude of current flow through the armature is controlled by the electronic control unit 13 which in turn is controlled by the electronic torsion bar sensor 12. Thus, the speed, torque, and direction of rotation of the armature will vary depending upon the amount and direction of twist of the torsion bar. The current flow to and from the armature 73 is through suitable brushes 115. Several brushes are provided but only one is shown in FIG. 3. The brushes 115 comprise a brush 116 which runs in contact with a commutator bar 117 associated with the armature 73. The brush 116 is encapsulated in a plastic cylinder 118 which has a plastic head 119 thereon. A metal sleeve 120 encircles the plastic cylinder 118 and is threaded into the housing 70 of the motor. An electrical lead is suitably attached to the brush 116.

From the above, it should be clear that the present invention may operate in a variety of different modes. For example, if the vehicle wheels 16, 17 are on ice and may be turned by an extremely small force, the steering of the vehicle may occur manually and the electric motor 14 not be energized. Under such conditions, when the steering wheel 10 is turned, the torsion bar 11 may be able to transmit enough torque to the pinion 54 to effect steering without substantial deflection. If this occurs, steering occurs in response to the pinion 54 rotating and transmitting manual force to the member 15 due to engagement of the teeth of the rack 22 with the teeth of the pinion 54. Under such condition the motor armature 73 will rotate but no detrimental affect results.

If the wheels of the vehicle 16 are on a surface where there is a substantial resistance to turning the wheels, turning of the hand wheel 10 will deflect the torsion bar 11. The deflection of the torsion bar 11 is limited by surfaces 130 or 131 (see FIG. 7) on the upper coupling part 40 engaging a facing surface 132 or 133 on the lower coupling part 50. When a pair of these surfaces engage, the amount of twisting that can occur in the torsion bar 11 is limited. Also, at maximum deflection of the torsion bar 11, there is a direct mechanical drive from the steering wheel 10 to the pinion 54.

Simultaneously, the electronic torsion bar sensor 12 is energized to provide a maximum electrical signal to the electronic control unit 13. The electric motor 14 is therefore energized to a maximum torque. When the motor 14 is energized, the ball nut 75 rotates and a force is applied through the balls 78 to effect movement of the member 15. This force is applied directly to the member 15 independently of the pinion, i.e., the force is not transmitted through the pinion. Thus both the electric motor 14 and pinion 54 simultaneously apply a force to the member 15 to effect movement of the member 15 to cause turning of the wheels 16, 17 of the vehicle.

If the force applied to the torsion bar 11 is such that the torsion bar does not deflect to its maximum extent, but does twist somewhat, the surfaces 130, 131 will not engage either of the surfaces 132, 133. However, the motor 14 will be energized due to the fact that the electronic torsion bar sensor 12 will sense the twisting of the torsion bar. As a result, the motor 14 will be energized and a force will be applied by the motor 14 to the screw portion 20 of the member 15. Thus, the manual force and the assisting force of the motor 14 will be applied to the member 15.

It should be apparent that the operator may turn the steering wheel 10 through a given angular movement and then either hold the steering wheel or may release the steering wheel. In either situation, turning of the wheels 16, 17 by the steering gear will stop and the torsion bar deflection sensor will be de-energized. If the operator releases the steering wheel 10 as is known, the reaction of the wheels 16, 17 on the road will tend to straighten the wheels. The torsion bar 11 will due to internal resiliency, return to an undeflected state, and the magnets 61, 62 will return to a neutral position relative to the Hall effect device 60.

In the event that the operator maintains the hand wheel in a position, in other words, the operator holds onto the steering wheel and prevents it from rotating, the motor 14 will cause movement of the member 15, rack 22, and rotate the pinion 54 to cause an untwisting of the torsion bar and a return of the magnets 61, 62 to a neutral position relative to the Hall effect device 60. The motor 14 will then be de-energized.

When the wheels 16, 17 are in a position in which the vehicle is moving in a straight line, the parts are in the positions shown in FIG. 3. The ball nut 75 is located so that the balls 78 are associated with the center part of the screw portion 20 of the member 15. Specifically, the center (indicated by the line X in FIG. 3) is located equal distances from the opposite end of the screw portion 20. Also, the pinion 54 is located centrally of the rack portion 21.

From the above it should be clear that the present invention provides a very compact, low cost electrical power rack and pinion steering gear. The steering gear is constructed so that when torque is applied to the hand wheel in excess of a predetermined amount, i.e., sufficient to cause a twisting of the torsion bar 11, the electric motor 14 is energized. When the motor 14 is energized in the preferred embodiment, there is an electrical assist to the manual steering of the vehicle. Also, in the event of a failure in the electrical assist, manual failsafe steering is provided.

Figure 8:
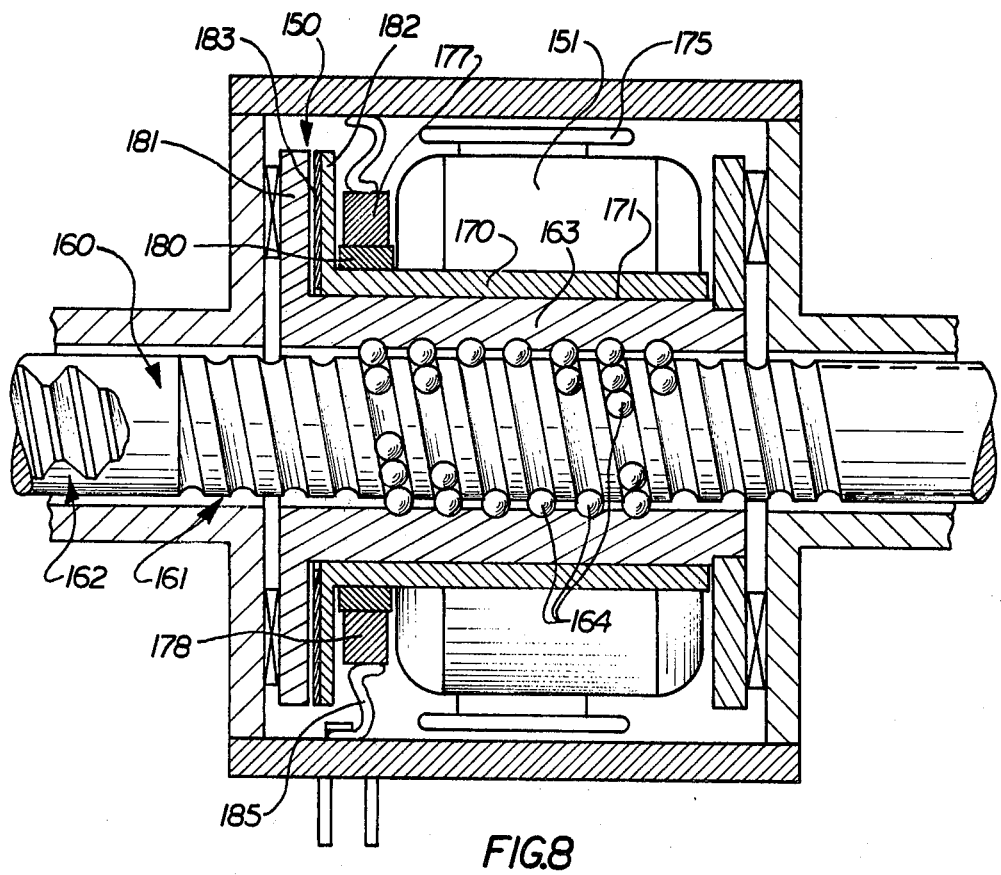
FIG. 8 is a sectional view of a second embodiment of the present invention.

A modified embodiment of the present invention is illustrated in FIG. 8. The embodiment shown in FIG. 8 is similar to the embodiment described above, but in addition includes a clutch mechanism 150 is interposed between the armature 151 and the ball nut 163. The clutch mechanism 150 provides for disengagement of the armature 151 from the ball nut 163 when the electric motor is not energized.

As shown in FIG. 8, a member 160 moves in opposite directions to effect steering of the vehicle. The member 160 is similar to the member 15 in the embodiment of FIG. 2. The member 160 includes a screw portion 161 and a rack portion 162. The rack portion 162 is adapted to cooperate with a pinion (not shown) and to effect movement of the member 160 in opposite directions in response to rotation of the pinion. The screw portion 161 cooperates with the ball nut 163. Upon rotation of the ball nut 163 the member 160 moves linearly due to the cooperation of the ball nut 163 and balls 164 which run in a complimentary screw thread in the internal diameter of the ball nut 163 and in the outer diameter of the screw portion 161 of the member 160.

In the embodiment shown in FIG. 8, the armature 151 is fixedly attached to a sleeve member 170. The sleeve member 170 is slidably and rotationally supported on the outer diamter 171 of the ball nut 163. The armature 151 is adjacent a plurality of permanent magnets 175. The magnets 175 encircle the armature 151. The armature 151 is axially offset in the magnetic field provided by magnets 175. Current is communicated to and from the armature 151 through a plurality of brushes, designated 177 and 178, which run in contact with a combar 180 associated with the armature 151.

The clutch 150 comprises a pair of flanges 181, 182. Flange 182 is fixed on the sleeve 170. Flange 181 is fixed to the ball nut 163. The flange 182 carries friction material 183.

The operation of the assembly shown in FIG. 8 should be clear from the description above. Upon flow of the current through the armature 151, the armature being offset in the magnetic field provided by the permanent magnets 175, will move axially toward the left as viewed in FIG. 8. Specifically, the armature will attempt to center itself in the magnetic field created by the magnets 175. When the armature moves to the left as shown in FIG. 8, it causes sliding of the sleeve 170 to slide on the outer diameter 171 of the ball nut 163. This sliding movement also causes the commutator bar 180 and brushes 177, 178 to move axially. The brushes 177, 178 are mounted on a spring type brush holder designated 185 which deflects and allows axial movement of the brushes. Axial movement of the sleeve 170 causes the friction material 183 to engage flange 181. Thus, the rotational movement of the armature 151 is transmitted to the ball nut 163 to effect rotation thereof. The arrangement of parts is such that the armature 151 never becomes totally centralized between the permanent magnets. Thus, there is a continuous biasing force causing a pressure engagement between the clutch faces while current is flowing through the armature.

It should be clear from the above that the embodiment of FIG. 8 is similar to the embodiment of FIG. 3 except that in the embodiment of FIG. 8 there is a clutch disposed between the armature and the member 160 to eliminate any necessity of the armature 151 rotating when manual steering occurs.

What is claimed is:

1. An assembly for pivoting the steerable wheels of a vehicle upon manual rotation of a steering wheel, said assembly comprising:
   a member which is axially movable to effect turning movement of the steerable vehicle wheels;
   ball screw and nut means for applying force to said member to move said member axially, said ball screw and nut means including;
   thread means connected with said member, rotatable nut means circumscribing at least a portion of said thread means and ball means for transmitting forces between said nut means and said thread means;
   an electric motor for rotating said nut means about the central axis of said member, said electric motor including
   a stator for providing a magnetic field, and a rotor disposed in a coaxial relationship with said member and rotatable under the influence of the magnetic field from said stator to rotate said nut means relative to said thread means;
   control means for energizing the stator of said electric motor to rotate said motor and nut means in response to rotation of the steering wheel; and
   a rack and pinion gear set for applying force transmitted from the steering wheel to said member and for moving said member axially and imparting rotary motion to said nut means to turn the steerable vehicle wheels upon failure of said electric motor, said rack and pinion gear set including
   a pinion gear rotatable with the steering wheel and
   a rack gear disposed in meshing engagement with said pinion gear and connected with said member.

2. An assembly as set forth in claim 1 wherein said nut means includes passage means extending between axially opposite ends of said nut means, said ball means including a plurality of ball elements each of which is movable in turn through said passage means upon rotation of said nut means relative to said member.

3. An assembly as set forth in claim 1 further including housing means for enclosing said rack and pinion gear set and said electric motor, said nut means including a longitudinally extending tubular element extending through a central portion of said rotor, first bearing means disposed adjacent to said rack and pinion gear set for supporting a first end portion of said tubular element for rotation relative to said housing, second bearing means for supporting a second end portion of said tubular element for rotation relative to said housing, said member extending axially through said tubular element, said ball means being disposed in engagement with said thread means at a location adjacent to the second end portion of said tubular element, said member being movable axially between a first position in which said rack gear is axially offset to one side of said first end portion of said tubular element and a second position in which said rack gear extends into said tubular element and is circumscribed by said first end portion of said tubular element.

4. An assembly as set forth in claim 1 further including means for continually interconnecting said rotor means and said nut means for rotation together.

5. An assembly as set forth in claim 1 further including clutch means operable between a disengaged condition in which said nut means is rotatable relative to said rotor means and an engaged condition in which said nut means and rotor means are interconnected for rotation together relative to said member, said control means including means for effecting operation of said clutch means from the disengaged condition to the engaged condition upon rotation of the steering wheel.

6. An assembly as set forth in claim 5 wherein said rotor means is axially movable and rotatable relative to said nut means, said assembly further including clutch means for holding said rotor means against rotation relative to said nut means when said clutch means is in an engaged condition, said clutch means being operable from a disengaged condition to an engaged condition under the influence of axial movement of said rotor means relative to said nut means.

* * * * *